No. 716,095. Patented Dec. 16, 1902.
F. PETERSON.
NUT LOCK.
(Application filed Mar. 18, 1902.)

(No Model.)

Witnesses.
E. Behel.
C. Clark

Inventor:
Fritz Peterson
By A. O. Behel
Atty.

THE NORRIS PETERS CO., PHOTO-LITHO., WASHINGTON, D. C.

UNITED STATES PATENT OFFICE.

FRITZ PETERSON, OF ROCKFORD, ILLINOIS.

NUT-LOCK.

SPECIFICATION forming part of Letters Patent No. 716,095, dated December 16, 1902.

Application filed March 18, 1902. Serial No. 98,838. (No model.)

*To all whom it may concern:*

Be it known that I, FRITZ PETERSON, a citizen of the United States, residing at Rockford, in the county of Winnebago and State of Illinois, have invented certain new and useful Improvements in Nut-Locks, of which the following is a specification.

The object of this invention is to construct a nut-lock in which two toothed disks are employed, a tooth of one disk adapted to be forced into the notch of the other disk and a nut having a connection with one of the disks.

Figure 1:
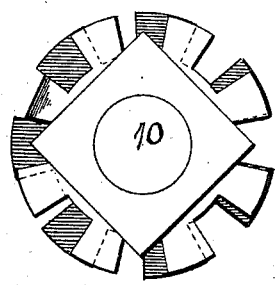
Figure 2:
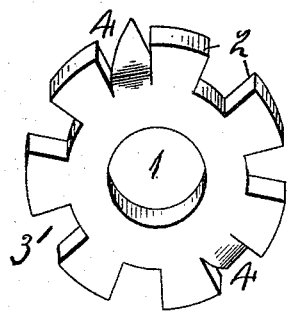
Figure 3:
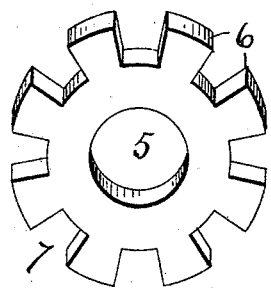
Figure 4:
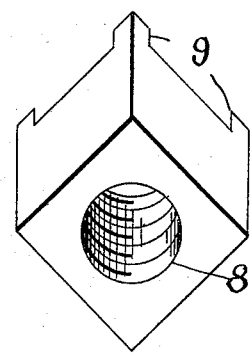

In the accompanying drawings, Figure 1 is a face view of my improved nut-lock. Fig. 2 is an isometrical representation of the base-plate. Fig. 3 is an isometrical representation of the intermediate plate. Fig. 4 is an isometrical representation of the nut.

The base-plate shown at Fig. 2 is circular in outline, has a central opening 1 and a series of teeth 2 evenly spaced, leaving notches 3. Two prongs 4 are formed from the material of the base-plate. The intermediate plate has a central opening 5 and a series of teeth 6, evenly spaced, leaving notches 7.

The nut is of the usual outline, having a central opening 8 and a series of projections 9, located at the corners of the nut.

If the nut-lock is used in connection with wooden material, the base-plate is placed over the projecting end of the bolt 10 and the prongs 4 firmly embedded in the wood. The intermediate plate is then placed on the bolt and the nut then turned on the bolt, the projections of the nut entering notches of the intermediate plate, thereby forming a connection between the nut and intermediate plate. By turning down on the nut the intermediate plate will be turned with it, and when the parts of the structure are brought together with sufficient force one of the projections of the intermediate plate will be found to overlie one of the notches of the base-plate, and the projection can be bent down into the notch, thereby forming a connection between the wooden structure and the nut. The nut can be loosened by raising the projection free of the notch, when it may be turned free of the bolt or tightened.

By forming the intermediate plate with more projections than the base-plate only a fraction of a revolution of the intermediate plate is necessary to bring one of its projections to coincide with a notch in the base-plate.

I claim as my invention—

1. A nut-lock comprising a base-plate having peripheral notches, an intermediate plate having peripheral projections adapted to enter the notches of the base-plate, and a nut having an adjustable connection with the intermediate plate so that the intermediate plate can be adjusted to bring any one of its projections in position to enter any one of the notches in the base-plate.

2. A nut-lock comprising a base-plate having peripheral notches and two peripheral prongs, an intermediate plate having peripheral projections adapted to enter the notches of the base-plate, and a nut having corner projections adapted to enter between the projections of the intermediate plate.

FRITZ PETERSON.

Witnesses:
A. O. BEHEL,
E. BEHEL.